(12) United States Patent
Hessling-von Heimendahl et al.

(10) Patent No.: US 10,974,847 B2
(45) Date of Patent: Apr. 13, 2021

(54) AIRCRAFT BEACON LIGHT AND AIRCRAFT COMPRISING AN AIRCRAFT BEACON LIGHT

(71) Applicant: Goodrich Lighting Systems GmbH, Lippstadt (DE)

(72) Inventors: Andre Hessling-von Heimendahl, Koblenz (DE); Anil Kumar Jha, Lippstadt (DE); Frank Klein, Langenberg (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/712,396

(22) Filed: Dec. 12, 2019

(65) Prior Publication Data
US 2020/0331629 A1 Oct. 22, 2020

(30) Foreign Application Priority Data

Apr. 18, 2019 (EP) ..................................... 19170233

(51) Int. Cl.
| | |
|---|---|
| *B64D 47/06* | (2006.01) |
| *F21S 4/28* | (2016.01) |
| *F21S 10/06* | (2006.01) |
| *F21Y 103/33* | (2016.01) |

(52) U.S. Cl.
CPC ................ *B64D 47/06* (2013.01); *F21S 4/28* (2016.01); *F21S 10/06* (2013.01); *B64D 2203/00* (2013.01); *F21Y 2103/33* (2016.08)

(58) Field of Classification Search
CPC ........ B64D 47/06; B64D 47/04; B64D 47/02; B64D 47/00; F21K 9/232; F21K 9/23; F21K 9/233; F21K 9/235; F21K 9/237
See application file for complete search history.

(56) References Cited

U.S. PATENT DOCUMENTS

| | | |
|---|---|---|
| 1,828,097 A | 10/1931 | Colvin |
| 3,706,968 A | 12/1972 | Turner, Jr. |
| 5,813,744 A | 9/1998 | Altebarmakian |
| 6,268,702 B1 | 7/2001 | Fleck |
| 9,771,168 B2 | 9/2017 | Hessling |

(Continued)

FOREIGN PATENT DOCUMENTS

| | | |
|---|---|---|
| EP | 2502828 A1 | 9/2012 |
| GB | 143095 A | 5/1920 |

OTHER PUBLICATIONS

Abstract of EP2502828A1, 1 page.
Extended European Search Report for International Application No. 19170233.1 dated Oct. 1, 2019, 9 pages.

*Primary Examiner* — Benyam Haile
(74) *Attorney, Agent, or Firm* — Cantor Colburn LLP

(57) ABSTRACT

An aircraft beacon light for being mounted to an aircraft fuselage includes: a support structure, having a carrier, and a stem for supporting the carrier and for spacing the carrier from the aircraft fuselage; and a lighting system, supported by the support structure, the lighting system having a plurality of light sources, light optics for redirecting at least a portion of the light emitted by the plurality of light sources, and a lens cover, with the plurality of light sources and the light optics being arranged between the carrier and the lens cover; wherein the aircraft beacon light is configured to emit a red-flashing beacon light output in operation.

20 Claims, 7 Drawing Sheets

(56) References Cited

U.S. PATENT DOCUMENTS

| | | |
|---|---|---|
| 10,156,627 B2 | 12/2018 | Beard |
| 2015/0274320 A1* | 10/2015 | Jha .......................... F21V 5/046 |
| | | 362/470 |
| 2017/0138584 A1 | 5/2017 | Hessling-Von Heimendahl et al. |
| 2018/0215481 A1 | 8/2018 | Sure et al. |
| 2018/0265220 A1* | 9/2018 | Li .......................... H05B 45/00 |

* cited by examiner

US 10,974,847 B2

AIRCRAFT BEACON LIGHT AND AIRCRAFT COMPRISING AN AIRCRAFT BEACON LIGHT

FOREIGN PRIORITY

This application claims priority to European Patent Application No. 19170233.1 filed Apr. 18, 2019, the entire contents of which is incorporated herein by reference.

BACKGROUND

The present invention relates to exterior aircraft lighting. In particular, it relates to an aircraft beacon light and an aircraft equipped therewith.

Almost all aircraft are equipped with exterior lighting systems. For example, large commercial aircraft have many different exterior lights. An exemplary group of exterior aircraft lights are lights for passive visibility, such as navigation lights, white strobe anti-collision lights, and red-flashing beacon lights. Common aircraft have two red-flashing beacon lights, arranged on the top of the aircraft fuselage and on the bottom of the aircraft fuselage, respectively. Their red flashes at least indicate that the engines of the aircraft are turned on. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights. Given the large number of exterior aircraft lights, an exterior aircraft lighting system with a low impact on the aircraft design/performance is beneficial.

Accordingly, it would be beneficial to provide an exterior aircraft light that provides for a good lighting effectiveness and a low impact on the aircraft operation.

SUMMARY

Exemplary embodiments of the invention include an aircraft beacon light for being mounted to an aircraft fuselage, comprising: a support structure, comprising a carrier, and a stem for supporting the carrier and for spacing the carrier from the aircraft fuselage; and a lighting system, supported by the support structure, the lighting system comprising a plurality of light sources, light optics for re-directing at least a portion of the light emitted by the plurality of light sources, and a lens cover, with the plurality of light sources and the light optics being arranged between the carrier and the lens cover; wherein the aircraft beacon light is configured to emit a red-flashing beacon light output in operation.

Exemplary embodiments of the invention allow for a beneficial positioning of the lighting system of the aircraft beacon light with respect to the aircraft fuselage and, thus, for a highly un-obstructed beacon light output, while having a low aerodynamic impact on the aircraft. With the stem spacing the lighting system from the aircraft fuselage, it may be possible for the aircraft beacon light to emit the red-flashing beacon light output into directions that were not possible with previous approaches, where the lighting system was mounted directly to the aircraft fuselage. Also, with the support structure having a stem and a carrier, the spacing of the lighting system from the aircraft fuselage may be carried out in a manner that has a low impact on the aero-dynamics of the aircraft. The term stem refers to a support element that has a smaller cross-section than the carrier, such that the spacing between the aircraft fuselage and the carrier may be achieved without adding a high amount of aerodynamic drag to the aircraft. The stem and the carrier may form a mushroom-type structure. The carrier may provide sufficient base area for carrying the extended lighting system, while the stem may support the lighting system in an aerodynamically efficient manner. An optically beneficial position for the lighting system of the aircraft beacon light may be achieved, while the aerodynamic impact of the aircraft beacon light may be kept within acceptable limits.

The stem spaces the carrier from the aircraft fuselage, when the air-craft beacon light is mounted to the aircraft fuselage. The stem thus spaces the lighting system from the aircraft fuselage. The plurality of light sources, the light optics, and the lens cover are spaced from the aircraft fuselage, when the aircraft beacon light is mounted to the aircraft fuselage. The lens cover does not enclose the stem with respect to the aircraft fuselage. The stem is an outside element of the aircraft beacon light.

The stem supports the carrier and spaces the carrier from the aircraft fuselage. The stem has a proximal side, facing the aircraft fuselage, and a distal side, to which the carrier is attached. The stem may be seen as a column or as a pillar for the carrier. The carrier protrudes past the distal side of the stem in a transverse direction. In other words, the carrier is a more extended structure than the stem in a plane parallel to that portion of the aircraft fuselage to which the aircraft beacon light is mounted. The stem and the carrier may be integrally formed. It is also possible that the stem and the carrier are originally separate components that are attached to each other.

The plurality of light sources and the light optics are arranged between the carrier and the lens cover. The lens cover is arranged over the plurality of light sources and the light optics, allowing for light from the plurality of light sources to pass through and protecting the plurality of light sources and the light optics from the hazardous aircraft environment, such as from the aerodynamic forces and from impinging particles during flight. The plurality of light sources and the light optics are enclosed by the lens cover with respect to the carrier. The lens structure may be a transparent or translucent structure, through which light from the plurality of light sources passes.

The aircraft beacon light is configured to emit a red-flashing beacon light output in operation. In other words, the aircraft beacon light is configured to emit flashes of red light in operation. The flashes of red light contribute to the beacon light functionality of the aircraft. The plurality of light sources may be a plurality of red light sources, such as red LED's. In this way, red light is generated, and the light optics and the lens cover may be free of color filters. It is also possible that the light optics and/or the lens cover comprise a red color filter. In this case, the plurality of light sources may for example be white light sources, with the downstream color filter providing for the red light output. The term red light output encompasses any kind of reddish shade of light. The red light output may be an aviation red light output in accordance with Federal Aviation Regulations (FAR) section 25.1397.

The aircraft beacon light is configured to emit a red-flashing beacon light output in operation. The beacon light output may be in accordance with Federal Aviation Regulations (FAR) section 25.1401. In particular, the beacon light output may satisfy the light intensity requirements of Federal Aviation Regulations (FAR) section 25.1401 at least for a semisphere above or below the horizontal plane. In other words, the beacon light output may satisfy at least the upper or the lower half of the light intensity requirements. The beacon light output may be jointly achieved by the plurality of light sources and the light optics or jointly achieved by the plurality of light sources, the light optics and the lens cover. The lens cover may have an active impact on shaping the beacon light output or may substantially pass through the light output, as shaped by the light optics.

The aircraft beacon light is configured to emit flashes of red light in operation. This wording relates to the perception of the light output by the observer. For example, a person on the airfield, when in the output range of the aircraft beacon light, sees red light flashes emitted by the aircraft beacon light.

The aircraft beacon light is configured to emit flashes of red light in operation. In particular, the aircraft beacon light may have a controller that selectively provides electric power to the plurality of light sources, thus illuminating the plurality of light sources in an intermittent manner, which in turn provides for the emission of red light flashes by the aircraft beacon light in operation. The controller may be coupled to an aircraft on-board power supply network on the one hand and to the plurality of light sources on the other hand.

The lighting system comprises a plurality of light sources. The plurality of light sources may comprise a plurality of LEDs. In a particular embodiment, the plurality of light sources may comprise a plurality of red LEDs and/or a plurality of infrared LEDs. In this way, the aircraft beacon light may be well-suited for use cases relying on visible light and/or for covert operations.

The lighting system comprises light optics for re-directing at least a portion of light emitted by the plurality of light sources. The light optics may comprise one or more lenses, one or more reflectors and/or one or more shutters. In a particular embodiment, the light optics may comprise one or more lenses and may be free from metallic reflectors and shutters.

According to a further embodiment, the carrier has a cross-sectional carrier extension and the stem has a cross-sectional stem extension and the cross-sectional carrier extension is between 5 times and 40 times, in particular between 10 times and 30 times, further in particular between 15 times and 25 times, as large as the cross-sectional stem extension. In this way, the spacing between the carrier and the aircraft fuselage is provided in a particularly aerodynamically efficient manner. For a given carrier extension, which is provided for supporting a given lighting system, the stem dimension is comparably small, having a low aerodynamic impact. For the comparison of the cross-sectional carrier extension and the cross-sectional stem extension, the area within the outer circumference of the carrier and the stem may be looked at. In particular, the outer circumference in that cross-section of the carrier may be considered that has the largest cross-sectional extension in a plane parallel to that portion of the aircraft fuselage to which the aircraft beacon light is mounted. For the stem, the extension in a cross-sectional plane parallel to the aircraft fuselage and in the middle between the carrier and the aircraft fuselage may be looked at. The stem may be a solid structure or a hollow structure. Regardless of the stem being solid or hollow, the outer extension thereof is looked at for the comparison of the cross-sectional carrier extension and the cross-sectional stem extension.

According to a further embodiment, the stem has an elongated shape. In particular, the stem may have an elongated shape between a front end and an aft end. The stem may have a rib shape, supporting the carrier in an extended manner, while having a small front surface area.

According to a further embodiment, the stem has a stem length and a stem width and the stem length is between 3 times and 15 times, in particular between 5 times and 12 times, further in particular between 8 times and 10 times as large as the stem width. With these ratios, a particularly good trade-off between support strength and low aerodynamic impact may be achieved. The term stem length refers to the extension of the stem in the longitudinal direction of the aircraft, and the term stem width refers to the extension in the transverse direction to the aircraft.

According to a further embodiment, the stem has an airfoil shape. Having an airfoil shape, the stem has a particularly low impact on the aircraft aerodynamics. The airfoil may for example be an airfoil as recommended by the National Advisory Committee for Aeronautics (NACA).

According to a further embodiment, the stem has a stem height and a height extension of the lighting system is between 60% and 120%, in particular between 80% and 100% of the stem height. With the stated ratios between the stem height and the height extension of the lighting system, a particularly favorable position of the lighting system above/below the aircraft fuselage may be achieved, providing a highly un-obstructed environment for the light output, while maintaining a high degree of stability across the aircraft beacon light. The height extension of the lighting system may be defined as the height of the envelope around the plurality of light sources, the light optics and the lens cover. The stem height and the height extension of the lighting system refer to the extension of the components in the vertical direction of the aircraft, i.e. in the z-direction of the aircraft.

According to a further embodiment, the stem has a stem height of be-tween the 20 mm and 80 mm, in particular of between 30 mm and 50 mm. The stem heights may be measured from the aircraft fuselage to the carrier of the support structure, when the aircraft beacon light is mounted to the aircraft fuselage.

According to a further embodiment, the plurality of light sources are spaced between 30 mm and 90 mm, in particular between 40 mm and 60 mm, from the aircraft fuselage. In other words, the aircraft beacon light has a configuration that provides for the plurality of light sources to be arranged between 30 mm and 90 mm, in particular between 40 mm and 60 mm, from the aircraft fuselage, when the aircraft beacon light is mounted to the aircraft fuselage.

According to a further embodiment, the support structure has a base for being mounted to the aircraft fuselage, the base being spaced from the carrier by the stem. In particular, the base may have a cross-sectional base extension that is larger than the cross-sectional extension of the stem. In this way, the base provides additional stability to the aircraft beacon light at a position where the aerodynamic impact is smaller than at the stem. The base may be shaped in a way that it can be mounted flush with the aircraft fuselage. In particular, the base may have a plate-like shape that may be inserted into a corresponding recess in the aircraft fuselage. Above discussed height extensions may be measured with respect to the upper surface of the base.

According to a further embodiment, the carrier has a central portion and the plurality of light sources are arranged around the central portion. In this way, the plurality of light sources have an arrangement on the carrier that corresponds well to the 360° light output requirements for aircraft beacon lights. In particular, the plurality of light sources may be arranged along a circular outline.

According to a further embodiment, the plurality of light sources face away from the carrier and the light optics comprise a lens structure arranged over the plurality of light sources and configured to reflect a first portion of light emitted by the plurality of light sources laterally outwards via total internal reflection. Directing the first portion of light of the plurality of light sources laterally outwards via total internal reflection may allow for a desired re-directing of light in a space-efficient manner. The first portion of light may enter the lens structure at a light entry surface, experience total internal reflection at a first total internal reflection surface, and exit the lens structure at a light exit surface. The lens structure may be placed in immediate vicinity to the plurality of light sources and may achieve an efficient re-directing of light without the need for more extensive reflector structures. Also, using the lens structure and its total internal reflection properties may allow for eliminating metallic reflectors, as provided in prior approaches, which may keep the maintaining efforts low.

According to a further embodiment, the lens structure is a unitary structure. In other words, the lens structure may be a single lens body arranged over the plurality of light sources. In particular, the lens structure may be a unitary, substantially annular structure. In this way, the lens structure may be conveniently arranged over the plurality of light sources. In the alternative, the lens structure may be comprised of two or more separate lenses, with each of the separate lenses being arranged over one or more of the plurality of light sources.

According to a further embodiment, the lens structure is made from silicone. Making the lens structure from silicone allows for the provision of a lens structure that has low sensitivity to the demanding operating environment of an aircraft. In particular, silicones are suitable for withstanding aggressive chemicals that may be present in the aircraft environment in the course of de-icing or due to exhaust from the jet engines. Also, silicones allow for providing the desired optical effects without problems of corrosion. Yet further, the lens structure may be molded from silicone in a convenient manner.

According to a further embodiment, the lens structure is overmolded over the plurality of light sources. In this way, a particularly dense and compact implementation of the aircraft beacon light may be achieved. Also, overmolding the lens structure over the plurality of light sources may allow for a low number of optical boundary surfaces, thus helping the overall efficiency of the aircraft beacon light. Further, overmolding the lens structure over the plurality of light sources allows for the provision of a mechanically strong attachment between the light sources and the lens structure.

According to a further embodiment, the lens structure is configured to reflect a second portion of light emitted by the plurality of light sources laterally inwards via total internal reflection. In this way, a very large portion of the light, emitted by the plurality of light sources, may be re-directed to portions of the beacon light output, where the highest light intensities are required. For example, the re-directing of light laterally outwards via total internal reflection may be used primarily for satisfying the light intensity requirements in the angular range between 0° and 10° with respect to the horizontal plane, while the re-directing of light laterally inwards via total internal reflection may be used for satisfying the light intensity requirements for an angular range between 10° and 30° with respect to the horizontal plane.

According to a further embodiment, the plurality of light sources are arranged in a substantially rotationally symmetric manner. The plurality of light sources may be arranged along a circular outline around a central portion of the carrier. In addition or alternatively, the light optics, in particular the lens structure, may be of a substantially rotationally symmetric design. The arrangement of the plurality of light sources and/or the light optics may be rotationally symmetric with respect to an axis through a central portion of the carrier.

According to a further embodiment, the lighting system has a horizontal reference plane, with the plurality of light sources being arranged on the horizontal reference plane, and the red-flashing beacon light output extends to the stem-side of the horizontal reference plane. In other words, in addition to providing a beacon light output on the distal side of the horizontal reference plane, the aircraft beacon light is configured to also provide some light output on the proximate side of the horizontal reference plane, i.e. on the stem-side of the horizontal reference plane. In this way, the spacing of the lighting system of the aircraft beacon light from the aircraft fuselage may be used for extending the beacon light output to more than one of the two hemispheres. For example, in case the aircraft beacon light is arranged on the top of the aircraft fuselage, the beacon light output may extend somewhat to the lower hemisphere, i.e. to below the aircraft in the optical far-field. Conversely, in case the aircraft beacon light is arranged on the bottom of the aircraft fuselage, the beacon light output may extend somewhat to the upper hemisphere, i.e. to above the aircraft in the optical farfield. In this way, the beacon light output may be used to fill in gaps in the overall beacon light output around the aircraft that may be created by engines, wing tips, or other exposed structures.

According to a further embodiment, the red-flashing beacon light output extends to an angular range of between 0° and 5°, further in particular to an angular range of between 0° and 10°, with respect to the horizontal reference plane on the stem-side of the horizontal reference plane.

According to a further embodiment, the support structure comprises at least one lightning arrestor. In a particular embodiment, the support structure may comprise two lightning arrestors, such as a front lightning arrestor and an aft lightning arrestor. The at least one lightning arrestor may be arranged at the periphery of the lens cover of the lighting system. By providing one or more lightning arrestors as part of the support structure, in particular at the periphery of the lens cover, the provision of a central lightning arrestor through the lens cover, as employed in previous approaches, may be eliminated. This in turn may eliminate the need for a cumbersome and often imperfect sealing of the central lightning arrestor with respect to the lens cover and/or for a cumbersome dealing with humidity entering the interior of the aircraft beacon light through the interface between the lens cover and the central lightning arrestor.

According to a further embodiment, the lens cover extends farther from the aircraft fuselage than the at least one lightning arrestor. In other words, the lens cover extends farther from the stem of the support structure than the at least one lightning arrestor in the height dimension of the aircraft beacon light. It has been surprisingly found that the lightning arrestors, being provided as part of the support structure, effectively divert lightning from the lens cover, even when extending less far from the aircraft fuselage than the lens cover.

According to a further embodiment, the aircraft beacon light further comprises an electric dehumidifier, the electric dehumidifier being arranged between the carrier and the lens cover. In this way, the humidity, entering into the inner space of the aircraft beacon light, may be removed without relying on drain valves or membrane-based exhaust structures. The electric dehumidifier may be arranged between a central portion of the carrier and the lens cover. In this way, the electric dehumidifier may provide for a particularly uniform removal of humidity within the interior of the aircraft beacon light.

Exemplary embodiments of the invention further include an aircraft comprising at least one aircraft beacon light, as described in any of the embodiments above. The additional features, modifications, and beneficial effects, as described above with respect to the exemplary embodiments of the aircraft beacon light, apply to the aircraft in an analogous manner.

According to a further embodiment, the aircraft comprises an upper aircraft beacon light, as described in any of the embodiments above, mounted to a top portion of the fuselage of the aircraft, and a lower aircraft beacon light, as described in any of the embodiments above, mounted to a bottom portion of the fuselage of the aircraft or to a belly fairing of the aircraft. For each of the upper aircraft beacon light and the lower aircraft beacon light, the mounting may be done in a way that the stem spaces the carrier and the lighting system from the aircraft fuselage, i.e. that the stem is arranged between the aircraft fuselage and the carrier of the aircraft beacon light.

BRIEF DESCRIPTION OF THE DRAWINGS

Further exemplary embodiments of the invention will be described below with respect to the accompanying drawings, wherein.

DETAILED DESCRIPTION

Figure 1:
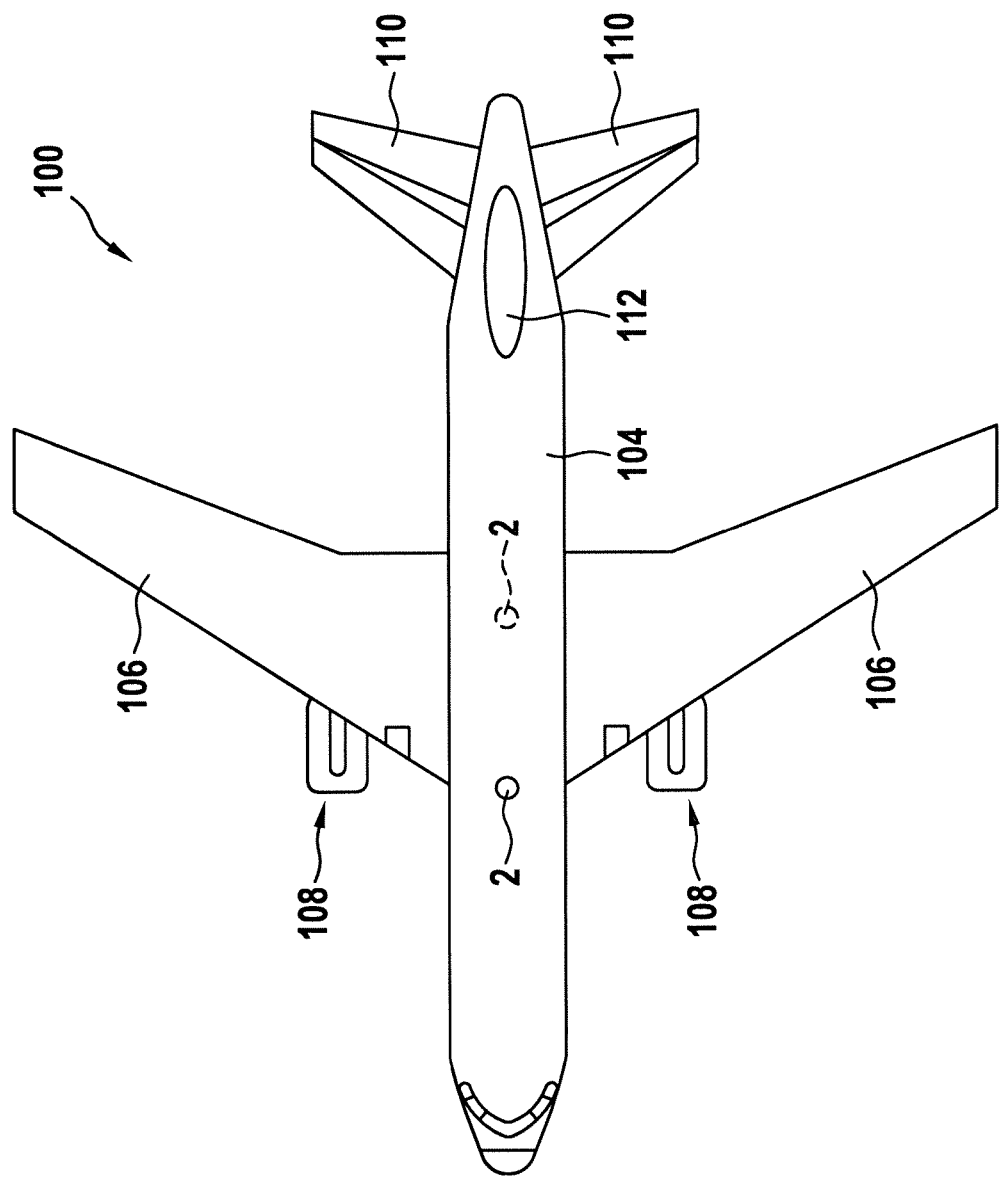
FIG. 1 shows an aircraft in accordance with an exemplary embodiment of the invention, equipped with two aircraft beacon lights in accordance with exemplary embodiments of the invention, in a schematic top view.

FIG. 1 shows an aircraft 100 in accordance with an exemplary embodiment of the invention. The aircraft 100 of FIG. 1 is an airplane, in particular a large commercial passenger or cargo airplane. It is pointed out that other types of aircraft, such as helicopters, may also be implemented in accordance with exemplary embodiments of the present invention.

The aircraft 100 has a fuselage 104. Two wings 106 are attached to the right and to the left of the fuselage 104. Each of the wings 106 carries a respective engine 108. Further, two horizontal stabilizers 110 and a vertical stabilizer 112 are mounted to a tail portion of the fuselage 104. Again, it is pointed out that aircraft in accordance with other designs and constructions are encompassed by exemplary embodiments of the present invention.

The aircraft 100 comprises two aircraft beacon lights 2, mounted to the fuselage 104. An upper aircraft beacon light 2 is mounted to a top portion of the fuselage 104 and is depicted with a solid circle in FIG. 1. A lower aircraft beacon light 2 is mounted to a bottom portion of the fuselage 104 and is depicted with a dashed circle in FIG. 1. The upper and lower aircraft beacon lights 2 are in accordance with exemplary embodiments of the invention, the details of which will be described in detail below with reference to FIGS. 3 to 7. In operation, the aircraft beacon lights 2 emit flashes of red light, in order to provide for the beacon light behaviour, as expected by other aircraft, ground personnel and air space control. In particular, the aircraft beacon lights 2 may emit flashes of aviation red light.

Figure 2:
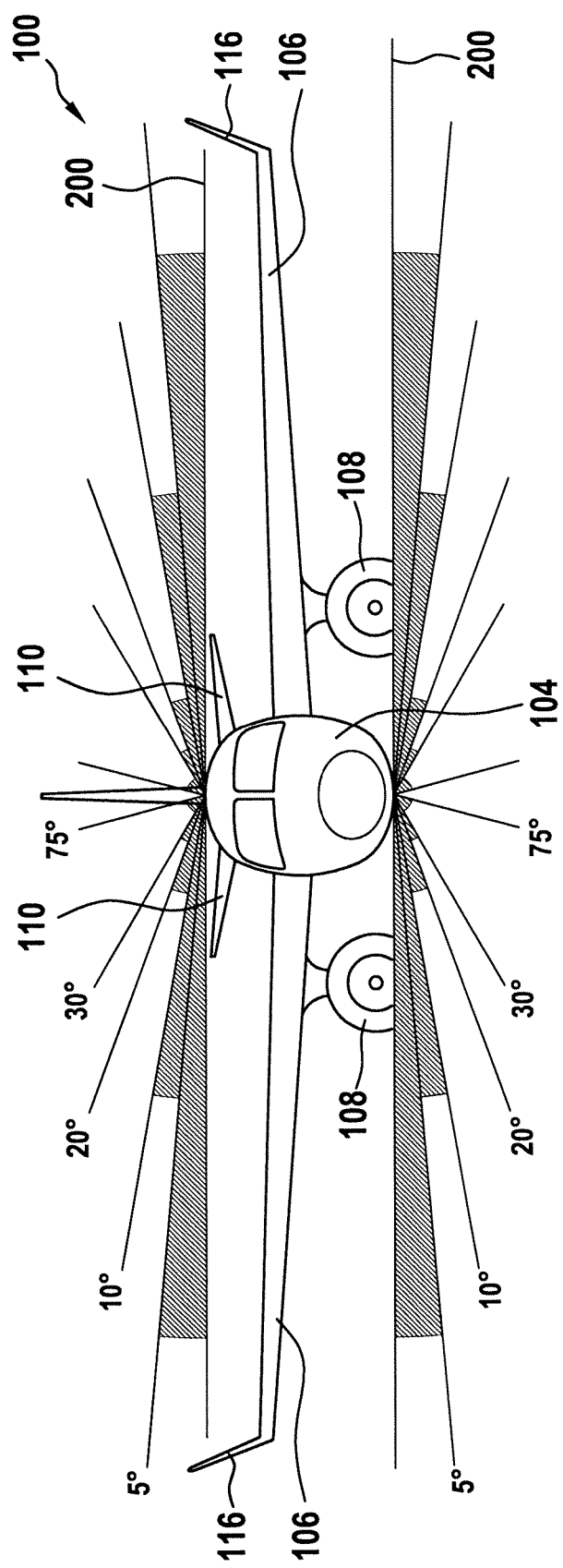
FIG. 2 illustrates the FAR requirements for aircraft beacon lights in an aircraft frame of reference, with an exemplary aircraft being shown in a front view.

FIG. 2 illustrates a light intensity distribution for an upper aircraft beacon light and a light intensity distribution for a lower aircraft beacon light, as required by the Federal Aviation Regulations (FAR), when mounted to the top/bottom of an exemplary aircraft 100. In particular, the depicted light intensity distributions reflect the requirements of FAR section 25.1401. The light intensity distributions are shown as angular distributions with respect to horizontal planes 200. In particular, the light intensity distributions are shown in a vertical cross-sectional plane that is orthogonal to the longitudinal extension of the aircraft fuselage. However, as the FAR requirements are described as a rotationally symmetric distribution, i.e. as a distribution that is identical in all viewing directions from the aircraft beacon light, the shown light intensity distributions would look the same in all vertical cross-sections through the center of the upper aircraft beacon light and through the center of the lower aircraft beacon light, respectively.

The depicted light intensity distribution of FIG. 2 is as follows. A light intensity of 400 cd is required for an angular range of between 0° and 5° with respect to the horizontal plane 200. A light intensity of 20 cd is required in an angular range of between 5° and 10° with respect to the horizontal plane 200. A light intensity of 80 cd is required in an angular range between 10° and 20° with respect to the horizontal plane 200. A light intensity of 40 cd is required in an angular range of between 20° and 30° with respect to the horizontal plane 200. A light intensity of 20 cd is required in an angular range of between 30° and 75° with respect to the horizontal plane 200. Accordingly, the required light intensity values, shown as angular sectors in FIG. 2, represent minimum light intensity values, as spelled out by the FAR. As the horizontal plane 200 is the plane with the highest required light intensity, it can also be referred to as main light output plane. The expressions of the beacon light output fulfilling the FAR requirements or satisfying the FAR requirements or being in accordance with the FAR requirements is to be understood as the beacon light output reaching or exceeding the required minimum light intensity values, as described above.

The exemplary aircraft beacon light of FIGS. 3 to 7 fulfils the requirements depicted in FIG. 2.

Figure 3:
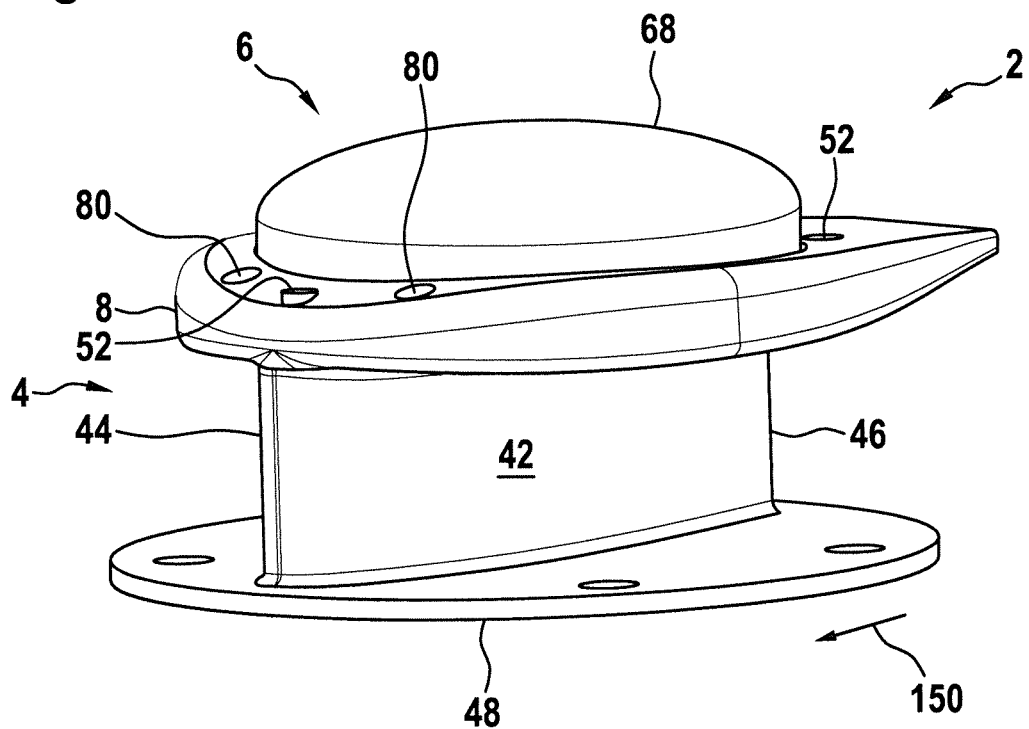
FIG. 3 shows an aircraft beacon light in accordance with an exemplary embodiment of the invention in a perspective view.

FIG. 3 shows an aircraft beacon light 2 in accordance with an exemplary embodiment of the invention in a perspective view. The aircraft beacon light 2 comprises a support structure 4 and a lighting system 6.

The support structure 4 comprises a base 48, a stem 42, and a carrier, which is blocked from view in the viewing direction of FIG. 3. The lighting system 6 comprises a plurality of light sources, light optics, and a lens cover 68. In the perspective view of FIG. 3, only the lens cover 68 is depicted, with the plurality of light sources and the light optics being arranged beneath the lens cover 68.

The aircraft beacon light 2 further comprises a fastener 8. The fastener 8 secures the lens cover 68 in position with respect to the support structure 4, as will be explained in more detail with respect to FIG. 6. The fastener 8 has bolt holes 80, through which bolts may be inserted for securing the fastener and, thus, the lens cover 68 to the carrier of the support structure 4.

The support structure 4 supports the lighting system 6 and is configured for being mounted to an aircraft fuselage. The carrier of the support structure 4 is a disc-shaped structure that supports the lens cover 68 and the other components of the lighting system 6. The base 48 is also a disc-shaped structure. The base 48 is mountable to the aircraft fuselage. The stem 42 spaces the base 48 from the carrier. In this way, the stem 42 spaces the lighting system 6 from the aircraft fuselage, when the aircraft beacon light 2 is installed on the aircraft fuselage.

The stem 42 has a front end 44 and an aft end 46. The stem 42 is an elongated structure, having a significantly greater length than width. When mounted to the aircraft fuselage, the longitudinal extension of the stem 42 from its front end 44 to its aft end 46 is aligned with the longitudinal extension of the aircraft. This is illustrated in FIG. 3 by the indication of the flight direction 150. The stem 42 has an airfoil shape between its front end 44 and its aft end 46, as will be described below with respect to FIG. 5.

The support structure 4 further comprises two lightning arrestors 52, namely a front lightning arrestor and an aft lighting arrestor. The lightning arrestors 52 extend through the fastener 8. They are arranged in close proximity to the perimeter of the lens cover 68.

The fastener 8 surrounds a proximate portion of the lens cover 68 of the lighting system 6. It provides for a clamping of the lens cover 68 to the support structure 4 all around the perimeter of the lens cover 68. The fastener 8 is also shaped for aerodynamic efficiency.

Figure 4:
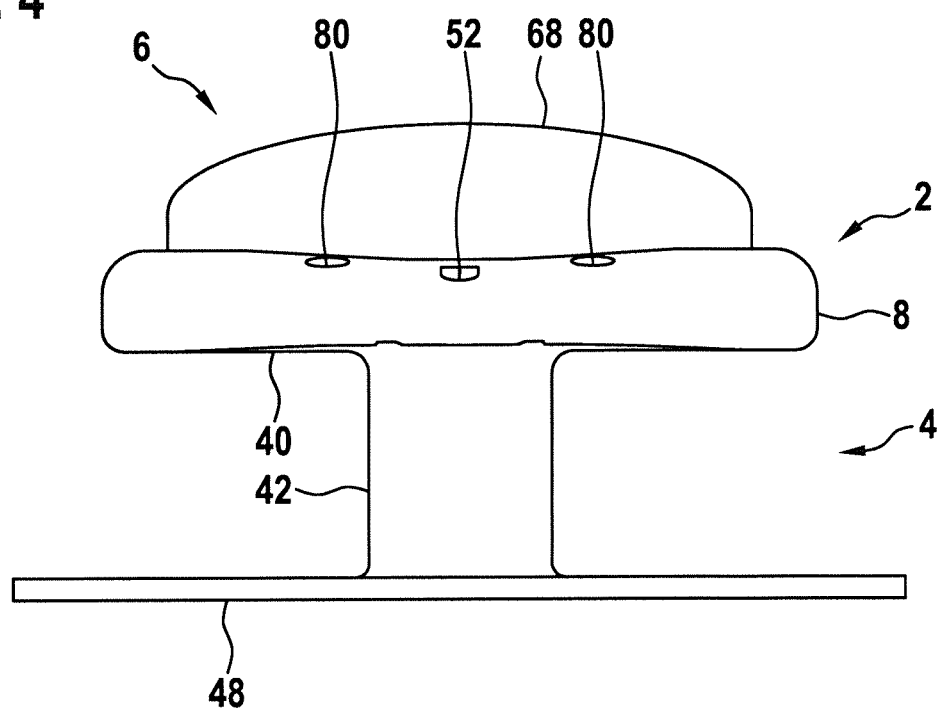
FIG. 4 shows the aircraft beacon light of FIG. 3 in a front view.

FIG. 4 shows the aircraft beacon light 2 of FIG. 3 in a front view. As stated above, the support structure 4 of the aircraft beacon light 2 comprises a base 48, a stem 42, and a carrier 40. The underside of the carrier 40, which was blocked from view in the viewing direction of FIG. 3, can be seen in FIG. 4. In the front view of FIG. 4, the carrier 40 extends to the left and to the right of the stem 42. The stem 42 has a much smaller transverse cross-section than the carrier 40. It also has a much smaller transverse cross-section than the base 48. The fastener 8 has a somewhat larger transverse extension than the carrier 40 and than the lens cover 68. The fastener 8 surrounds the carrier 40 and the proximate portion of the lens cover 68, securing the lens cover 68 to the carrier 40.

Figure 5:
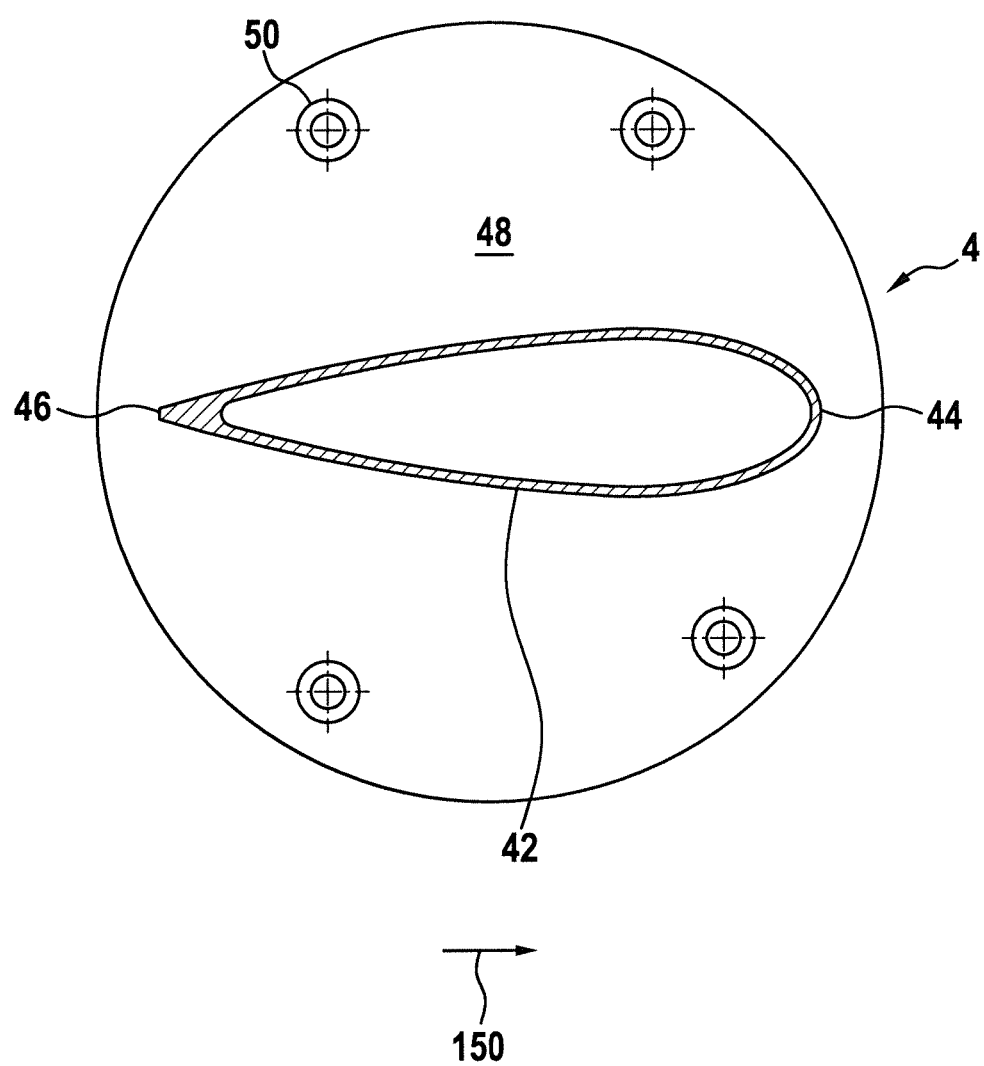
FIG. 5 shows the aircraft beacon light of FIG. 3 in a horizontal cross-sectional view.

FIG. 5 shows the aircraft beacon light 2 of FIG. 3 in a horizontal cross-sectional view. The cross-sectional plane of FIG. 5 runs through the stem 42. The viewing direction is onto the base 48 of the support structure 4.

In the depicted exemplary embodiment, the base 48 comprises four mounting holes 50. For mounting the aircraft beacon light 2 to the aircraft fuselage, four bolts are inserted through the mounting holes 50, securing the base 48 to the aircraft fuselage. The aircraft fuselage may have a recess, corresponding in shape and size to the disc-shaped base 48. In this way, the upper surface of the base 48 may be flush with the outer surface of the aircraft fuselage, when the aircraft beacon light 2 is mounted thereto.

In the depicted exemplary embodiment, the stem 42 has an airfoil shape. The airfoil shape expands to its largest width fairly closely to the front end 44, while it tapers to the aft end 46 over a large part of its longitudinal extension. In the depicted exemplary embodiment, the airfoil shape is in accordance with the NACA 0012 airfoil specification. It is pointed out that other airfoil shapes are possible as well.

In the depicted exemplary embodiment, the stem 42 is hollow. The wall structure forming the airfoil is thin, as compared to the outer extension of the stem 42. It is pointed out that the stem 42 may be a solid structure as well.

Figure 6A:
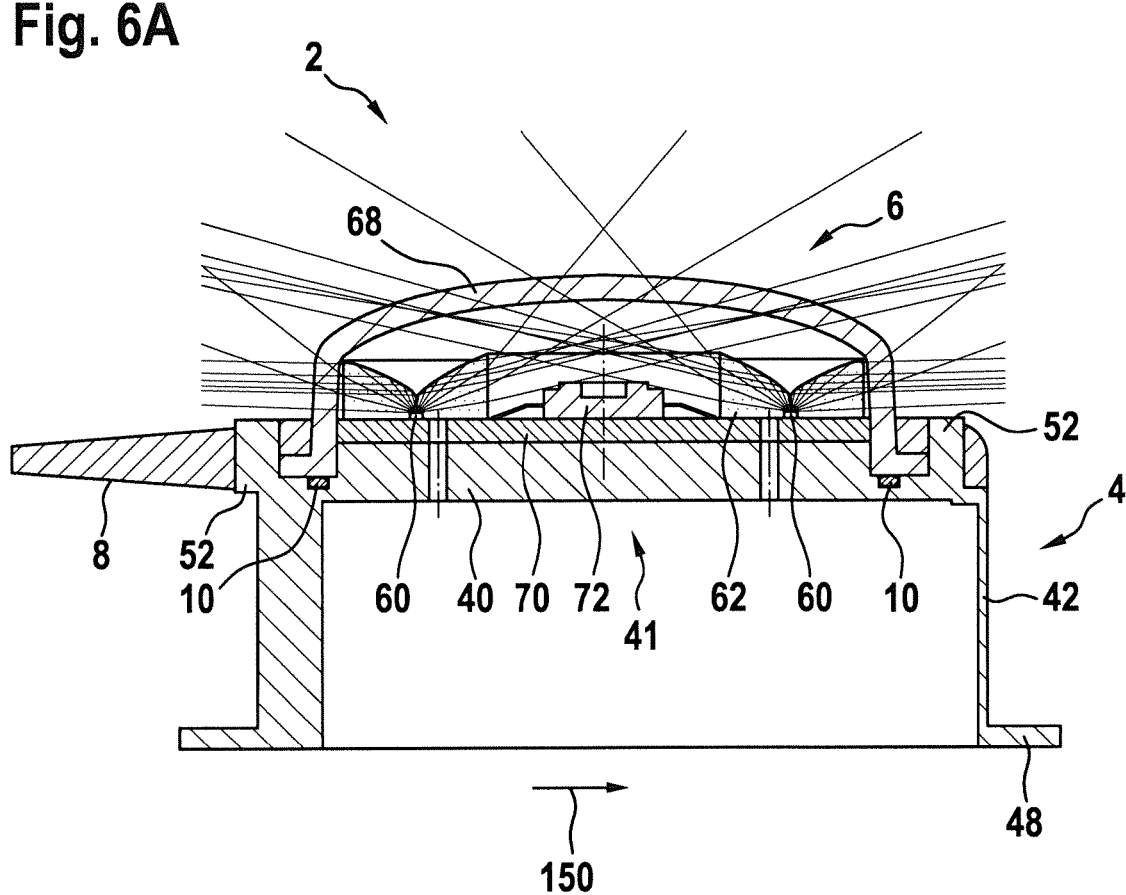
FIG. 6 shows the aircraft beacon light of FIG. 3 in a vertical cross-sectional view.
Figure 6B:
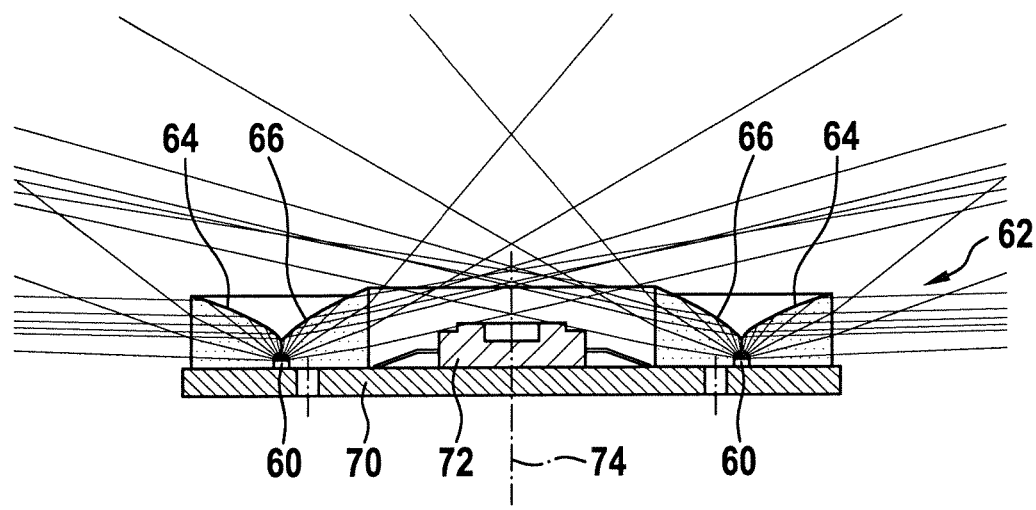

FIG. 6 shows the aircraft beacon light 2 of FIG. 3 in a vertical cross-sectional view. The cross-sectional plane of FIG. 6 is a longitudinal cross-sectional plane in the aircraft frame of reference and runs through the center of the aircraft beacon light 2. While FIG. 6A shows the aircraft beacon light 2 in its entirety, FIG. 6B shows selected components thereof in an enlarged view.

As stated before, the aircraft beacon light 2 comprises a support structure 4 and a lighting system 6. As further stated before, the support structure 4 comprises a base 48, a stem 42, and a carrier 40. The stem 42 spaces the base 48 from the carrier 40. With the stem 42 being a hollow structure in the depicted exemplary embodiment, the carrier 40 closes said hollow structure on the distal side. In the depicted exemplary embodiment, the carrier 40 supports the lighting system 6, as will be explained in more detail below.

The support structure 4 further comprises two lightning arrestors 52, which are arranged on a front portion and an aft portion of the carrier 40. In the exemplary embodiment of FIG. 6, the base 48, the stem 42, the carrier 40 and the lightning arrestors 52 are integrally formed.

The lighting system 6 comprises a plurality of light sources 60, light optics 62, a lens cover 68, a circuit board 70, such as a printed circuit board, and an electric dehumidifier 72. The circuit board is mounted to the carrier 40, for example via attachment screws or other suitable attachment means. The plurality of light sources 60, the light optics 62, and the electric dehumidifier 72 are mounted to the circuit board 70 and are, thus, supported by the carrier 40. The circuit board 70 may carry further components, such as a control unit, and may provide for the electric connections between the components, such as electric connections between an on-board electricity network, the control unit, and the plurality of light sources.

The lens cover 68 is a dome-shaped structure. The proximate portion of the lens cover 68 is placed around a step in the upper surface of the carrier 40. In this way, the lens cover 68 is prevented from lateral movement by the carrier 40. In the depicted exemplary embodiment, the proximate portion of the lens cover 68 is arranged between said step in the upper surface of the carrier 40 and the lightning arrestors 52. In this way, the lightning arrestors 52 are arranged in close vicinity to the perimeter of the lens cover 68.

The aircraft beacon light 2 further comprises an O-ring 10 that is arranged between the lens cover 68 and the carrier 40 of the support structure 4. With the O-ring 10, an effective sealing of the inner space of the aircraft beacon light 2 between the carrier 40 and the lens cover 68 is achieved. The lens cover 68 is clamped to the support structure 4, in particular to the carrier 40 thereof, by fastener 8.

The plurality of light sources 60, the light optics 62 and the electric dehumidifier 72 are arranged between the carrier 40 and the lens cover 68, i.e. in the inner space of the aircraft beacon light. The plurality of light sources 60 are arranged in a circular manner around a central portion 41 of the carrier 40. The plurality of light sources 60 are red LEDs in the depicted exemplary embodiment. The plurality of light sources 60 face away from the carrier 40.

In the depicted exemplary embodiment, the light optics 62 comprise an annular lens structure. The annular lens structure is arranged over the plurality of light sources 60, in particular overmolded over the plurality of light sources 60. The annular lens structure may be made from silicone or other suitable transparent or translucent material, such as PMMA.

The annular lens structure has a first total internal reflection surface 64 and a second total internal reflection surface 66. The first total internal reflection surface 64 reflects a first portion of light, emitted by the plurality of light sources 60, laterally outwards. The second total internal reflection surface 66 reflects a second portion of light, emitted by the plurality of light sources 60, laterally inwards. The redirecting of light by the annular lens structure is illustrated via exemplary light rays in FIG. 6. The re-directing of the light from the plurality of LEDs 60 via the first total internal reflection surface 64 and the second total internal reflection surface 66 allows for an efficient fulfilling of the FAR requirements for aircraft beacon lights, while also allowing for a low height of the light optics 62. The plurality of light sources 60, the light optics 62, and the lens cover 68 are arranged in a rotationally symmetric manner around an axis of rotation 74.

The electric dehumidifier 72 is arranged in the center of the annular lens structure. The electric dehumidifier is a device that converts water into hydrogen and oxygen with the help of electric energy. The generated hydrogen is highly evasive and may escape through the sealing. In this way, water and humidity, build up in the inner space of the aircraft beacon light, may be efficiently removed.

The spacing of the lighting system 6 from the aircraft fuselage via the stem 42, the re-directing of light via total internal reflection, the arrangement of the lightning arrestors 52 at the periphery of the lens cover 68, and the provision of the electric dehumidifier 72 co-operate to provide an overall favorable system design. The spacing of the lighting system 6 from the aircraft fuselage via the stem 42 and the re-directing of light via total internal reflection allow for an efficient fulfilling of the aircraft beacon light functionality with a low height extension of the lighting system 6. With the low height extension of the lighting system 6, the lightning arrestors 52 are sufficient for diverting a potential lightning strike from the lens cover 68, although the lightning arrestors are placed around the periphery of the lens cover 68 and have a smaller height extension than the lens cover 68. The provision of the lightning arrestors 52 outside of the lens cover 68 eliminates the need for a central lightning arrestor, extending through the lens cover 68. Without such a central lightning arrestor, the sealing of the inner space of the aircraft beacon light 2 may be carried out in a particularly effective manner. This results in a low amount of humidity/water being trapped in the inner space of the aircraft beacon light 2, and this low amount of water/humidity can be conveniently taken care of by the electric dehumidifier 72.

In the depicted exemplary embodiment, the opening angles for the light output is about 180°. In this way, the aircraft beacon light 2 is able to satisfy the FAR requirements for the upper hemisphere or for the lower hemisphere in the aircraft frame of reference. It is pointed out that the opening angle of the beacon light output may also be more than 180° in one or more or all vertical cross-sections through the aircraft beacon light 2. This may be achieved with a modified geometry of the first total internal reflection surface 64 or with other suitable means for directing the light accordingly. The effect of the opening angle of the beacon light output being more than 180° will be illustrated and explained in more detail with respect to FIG. 8.

In operation, the aircraft beacon light 2 emits a red-flashing beacon light output. In particular, the plurality of light sources may be controlled to light up in a pulsed manner. Further in particular, the plurality of light sources may be controlled to light up in a pulsed pattern that creates a perception of a sequence of red light flashes for a human observer. The aircraft beacon light 2 may comprise a control unit that causes the plurality of light sources to emit a sequence of light flashes. The control unit may be coupled to an on-board power supply and may provide current pulses to the plurality of LEDs.

Figure 7:
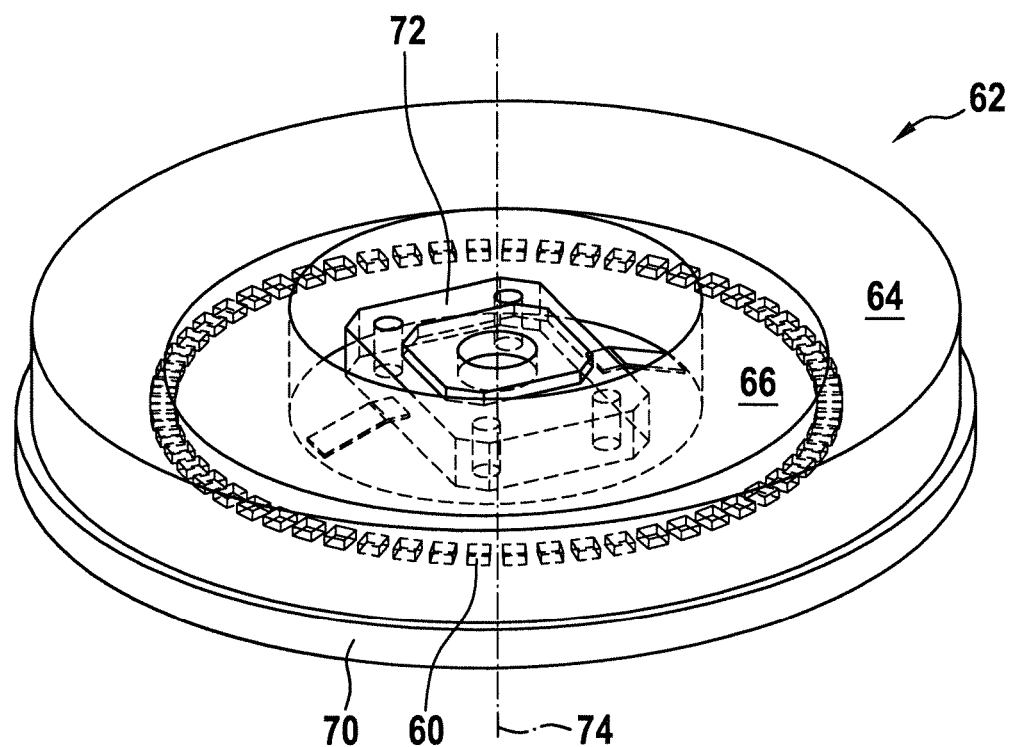
FIG. 7 shows selected components of the aircraft beacon light of FIG. 3 in a perspective view.

FIG. 7 shows the circuit board 70, the plurality of light sources 60, the light optics 62, and the electric dehumidifier 72 in a three-dimensional perspective view. Again, FIG. 7 shows the annular structure of the light optics 62, including its first total internal reflection surface 64 and its second total internal reflection surface 66, and the arrangement of the plurality of light sources 60 along a circular outline.

Figure 8:
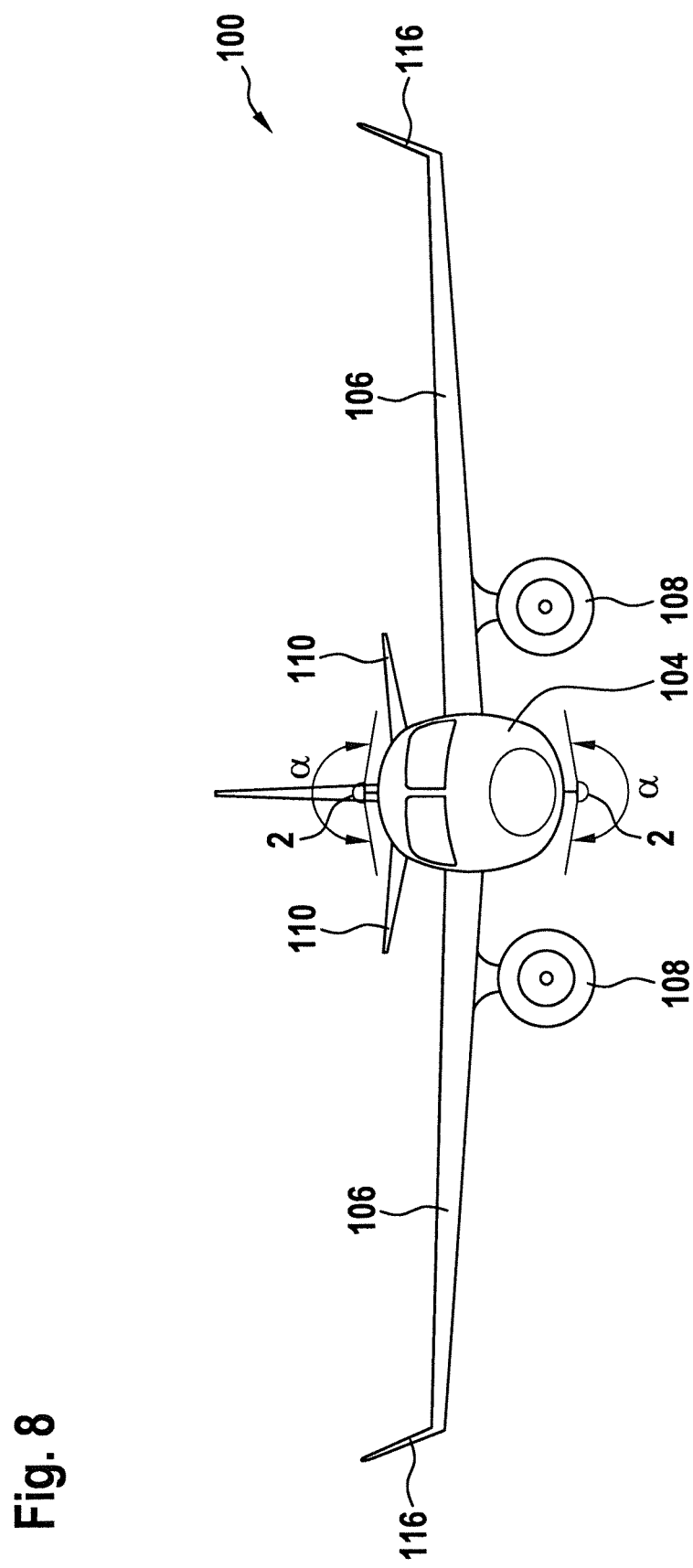
FIG. 8 shows an aircraft in accordance with an exemplary embodiment of the invention, equipped with two aircraft beacon lights in accordance with exemplary embodiments of the invention, in a front view.

FIG. 8 shows an aircraft 100 in accordance with an exemplary embodiment of the invention, equipped with two aircraft beacon lights 2 in accordance with an exemplary embodiment of the invention. In particular, the aircraft 100 has an upper beacon light 2 in accordance with an exemplary embodiment of the invention, mounted to a top portion of the aircraft fuselage 104. Further, the aircraft 100 has a lower air-craft beacon light 2, mounted to a bottom portion of the aircraft fuselage 104. For ease of illustration, only the stem and the lens cover of the aircraft beacon lights 2 are depicted. Also, the stem and the lens cover are depicted highly schematically and larger than they would be if depicted to scale. In this way, the spacing of the lens cover and, thus, of the lighting system from the aircraft fuselage 104 is more clearly illustrated.

Both the upper aircraft beacon light 2 and the lower aircraft beacon light 2 provide for a beacon light output that has an opening angle of more than 180°, indicated by the angle a in FIG. 8. In other words, both depicted aircraft beacon lights 2 provide for a beacon light output that extends to the stem-side of a horizontal reference plane through the plurality of light sources, i.e. to the side of the aircraft fuselage 104 of the horizontal reference plane through the plurality of light sources. In this way, the upper and lower aircraft beacon lights 2 may help in mitigating the shadowing of the beacon light output, as may be caused by the engines 108, the wing tips 116 or other aircraft structures. In particular, in the far-field, the beacon light output of the upper aircraft beacon light 2 may fill in the gaps in the beacon light output that are caused by the engines 108 with respect to the light emitted by the lower aircraft beacon light 2. Similarly, in the far-field, the beacon light output of the lower aircraft beacon light 2 may fill in the gaps in the beacon light output that are caused by the wing tips 116 with respect to the light emitted by the upper aircraft beacon light 2. Accordingly, exemplary embodiments of the invention may allow for achieving a more complete beacon light output around the aircraft. The opening angle a may for example be between 185° and 210°, in particular between 190° and 200°. The opening angle α being 190° means that the beacon light output extends to an angular range of between 0° and 5° on the stem-side of a horizontal reference plane through the aircraft beacon light 2, the opening angle a being 200° means that the beacon light output extends to an angular range of between 0° and 10° on the stem-side of a horizontal reference plane through the aircraft beacon light 2, etc.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Aircraft beacon light for being mounted to an aircraft fuselage, comprising:
   a support structure, comprising:
   a carrier, and
   a stem for supporting the carrier and for spacing the carrier from the aircraft fuselage; and
   a lighting system, supported by the support structure, the lighting system comprising:
   a plurality of light sources,
   light optics for re-directing at least a portion of the light emitted by the plurality of light sources, and
   a lens cover, with the plurality of light sources and the light optics being arranged between the carrier and the lens cover;
   wherein the aircraft beacon light is configured to emit a red-flashing beacon light output in operation,
   wherein the stem has an airfoil shape.

2. The aircraft beacon light according to claim 1, wherein the carrier has a cross-sectional carrier extension and the stem has a cross-sectional stem extension and wherein the cross-sectional carrier extension is between 5 times and 40 times as large as the cross-sectional stem extension.

3. The aircraft beacon light according to claim 1, wherein the stem has an elongated shape.

4. The aircraft beacon light according to claim 1, wherein the stem has a stem length and a stem width and wherein the stem length is between 3 times and 15 times as large as the stem width.

5. The aircraft beacon light according to claim 4, wherein the stem has a stem length and a stem width and wherein the stem length is between 5 times and 12 times as large as the stem width.

6. The aircraft beacon light according to claim 4, wherein the stem has a stem length and a stem width and wherein the stem length is between 8 times and 10 times as large as the stem width.

7. The aircraft beacon light according to claim 1, wherein the stem has a stem height and wherein a height extension of the lighting system is between 60% and 120% of the stem height.

8. The aircraft beacon light according to claim 7, wherein the stem has a stem height and wherein a height extension of the lighting system is between 80% and 100% of the stem height.

9. The aircraft beacon light according to claim 1, wherein the plurality of light sources are spaced between 30 mm and 90 mm from the aircraft fuselage.

10. The aircraft beacon light according to claim 9, wherein the plurality of light sources are spaced between 40 mm and 60 mm from the aircraft fuselage.

11. The aircraft beacon light according to claim 1, wherein the support structure has a base for being mounted to the aircraft fuselage, the base being spaced from the carrier by the stem.

12. The aircraft beacon light according to claim 1, wherein the carrier has a central portion and wherein the plurality of light sources are arranged around the central portion.

13. The aircraft beacon light according to claim 1, wherein the plurality of light sources face away from the carrier and wherein the light optics comprise a lens structure arranged over the plurality of light sources and configured to reflect a first portion of light emitted by the plurality of light sources laterally outwards via internal reflection.

14. The aircraft beacon light according to claim 1, wherein the lighting system has a horizontal reference plane, with the plurality of light sources being arranged on the horizontal reference plane, and wherein the red-flashing beacon light output extends to the stem-side of the horizontal reference plane to an angular range of between 0° and 5° with respect to the horizontal reference plane.

15. The aircraft beacon light according to claim 1, wherein the lighting system has a horizontal reference plane, with the plurality of light sources being arranged on the horizontal reference plane, and wherein the red-flashing beacon light output extends to the stem-side of the horizontal reference plane to an angular range of between 0° and 10° with respect to the horizontal reference plane.

16. The aircraft beacon light according to claim 1, wherein the support structure comprises at least one lightning arrestor, the at least one lightning arrestor in particular being arranged at the periphery of the lens cover.

17. The aircraft beacon light according to claim 16, wherein the lens cover extends farther from the aircraft fuselage than the at least one lightning arrestor.

18. The aircraft beacon light according to claim 1, further comprising an electric dehumidifier, the electric dehumidifier being arranged between the carrier and the lens cover, in particular being arranged between a central portion of the carrier and the lens cover.

19. The aircraft beacon light according to claim 1, wherein the carrier has a cross-sectional carrier extension and the stem has a cross-sectional stem extension and wherein the cross-sectional carrier extension is between 10 times and 30 times as large as the cross-sectional stem extension.

20. An aircraft comprising:
   an upper aircraft beacon light mounted to a top portion of a fuselage of the aircraft; and
   a lower aircraft beacon light mounted to a bottom portion of the fuselage of the aircraft or to a belly fairing of the aircraft,
   wherein the upper and lower aircraft beacon lights are both configured to emit a red-flashing beacon light output in operation and both include:
   a support structure, comprising:
   a carrier, and
   a stem for supporting the carrier and for spacing the carrier from the aircraft fuselage, wherein the stem has an airfoil shape; and
   a lighting system, supported by the support structure, the lighting system comprising:
   a plurality of light sources, light optics for re-directing at least a portion of the light emitted by the plurality of light sources, and a lens cover, with the plurality of light sources and the light optics being arranged between the carrier and the lens cover.

* * * * *